(12) United States Patent
Watson et al.

(10) Patent No.: US 12,387,855 B2
(45) Date of Patent: Aug. 12, 2025

(54) REFUELING WATER STORAGE TANK (RWST) WITH TAILORED PASSIVE EMERGENCY CORE COOLING (ECC) FLOW

(71) Applicant: BWXT mPower, Inc., Charlotte, NC (US)

(72) Inventors: Ronald C. Watson, Forest, VA (US); John D. Malloy, III, Goode, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 17/840,137

(22) Filed: Jun. 14, 2022

(65) Prior Publication Data

US 2023/0073091 A1 Mar. 9, 2023

Related U.S. Application Data

(62) Division of application No. 14/169,192, filed on Jan. 31, 2014, now Pat. No. 11,373,768.

(Continued)

(51) Int. Cl.
*G21C 15/18* (2006.01)

(52) U.S. Cl.
CPC ............ *G21C 15/18* (2013.01); *Y02E 30/30* (2013.01)

(58) Field of Classification Search
CPC .................................................. G21C 15/18
See application file for complete search history.

(56) References Cited

U.S. PATENT DOCUMENTS

| 3,649,451 A | 3/1972 | yedidia |
| 4,064,392 A | 12/1977 | Desalu |

(Continued)

FOREIGN PATENT DOCUMENTS

| CN | 101847451 A | 9/2010 |
| CN | 102903404 A | 1/2013 |

(Continued)

OTHER PUBLICATIONS

Castleberry, Gary. "Babcock & Wilcox Pressurized Water Reactors." See p. 27. 35 pages total. Available online :<http://odhonline.org/courses/e183/e183content.pdf>. (Year: 2012).

(Continued)

*Primary Examiner* — Sharon M Davis
(74) *Attorney, Agent, or Firm* — Nelson Mullins Riley & Scarborough LLP (57) ABSTRACT

A nuclear reactor comprises a pressure vessel containing a nuclear reactor core. A reactor core cooling system comprises a standpipe including a plurality of orifices in fluid communication with a refueling water storage tank (RWST) to drain water from the RWST into the standpipe, and an injection line configured to drain water from the standpipe to the pressure vessel. In some embodiments the standpipe is disposed in the RWST, while in other embodiments the standpipe is disposed outside of the RWST and cross-connection pipes connect the plurality of orifices with the RWST. The reactor core cooling system may further comprise a valve configured to control flow through one orifice of the plurality of orifices in fluid communication with the RWST based on water level in the standpipe. The valve may comprise a float valve having its float disposed in the standpipe.

6 Claims, 10 Drawing Sheets

Related U.S. Application Data (60) Provisional application No. 61/794,206, filed on Mar. 15, 2013, provisional application No. 61/777,026, filed on Mar. 12, 2013.

(56) References Cited

U.S. PATENT DOCUMENTS

| | | | |
|---|---|---|---|
| 4,396,560 A | | 8/1983 | Stofer |
| 4,473,528 A | | 9/1984 | Kleimola |
| 4,576,782 A | | 3/1986 | Loose |
| 4,587,080 A | | 5/1986 | Johnson |
| 4,753,771 A | * | 6/1988 | Conway .......... G21C 15/18 376/293 |
| 4,897,240 A | | 1/1990 | Sako |
| 4,927,596 A | | 5/1990 | Minnick |
| 4,986,956 A | | 1/1991 | Garabedian |
| 5,000,907 A | | 3/1991 | Chevereau et al. |
| 5,011,652 A | | 4/1991 | Tominaga et al. |
| 5,045,274 A | | 9/1991 | Donaldson |
| 5,049,353 A | | 9/1991 | Conway et al. |
| 5,075,070 A | | 12/1991 | Costes |
| 5,085,825 A | | 2/1992 | Gluntz |
| 5,087,408 A | | 2/1992 | Tominaga et al. |
| 5,102,616 A | | 4/1992 | Gardner et al. |
| 5,106,571 A | | 4/1992 | Wade et al. |
| 5,180,543 A | | 1/1993 | Conway |
| 5,202,083 A | | 4/1993 | Spinks et al. |
| 5,259,008 A | | 11/1993 | Schulz |
| 5,268,943 A | | 12/1993 | Corletti et al. |
| 5,276,720 A | | 1/1994 | Oosterkamp et al. |
| 5,282,230 A | | 1/1994 | Billig et al. |
| 5,295,168 A | | 3/1994 | Gluntz |
| 5,301,216 A | | 4/1994 | Klapdor et al. |
| 5,309,488 A | * | 5/1994 | Matsuoka ........ G21C 15/18 376/282 |
| 5,349,617 A | | 9/1994 | Gautier |
| 5,511,102 A | * | 4/1996 | Gluntz .......... G21C 15/18 376/283 |
| 5,517,538 A | | 5/1996 | Seidelberger et al. |
| 5,661,770 A | | 8/1997 | Spinks |
| 5,694,442 A | | 12/1997 | Cinotti et al. |
| 5,887,043 A | | 3/1999 | Spinks |
| 6,243,432 B1 | | 6/2001 | Cheung et al. |
| 6,795,518 B1 | | 9/2004 | Conway et al. |
| 7,154,982 B2 | | 12/2006 | Gautier et al. |
| 8,170,173 B2 | | 5/2012 | Reyes, Jr. et al. |
| 8,559,583 B1 | | 10/2013 | Sato |
| 8,559,584 B2 | | 10/2013 | Cook |
| 9,761,334 B2 | | 9/2017 | Kim |
| 9,859,027 B2 | | 1/2018 | Kim |
| 11,373,768 B2 | | 6/2022 | Watson et al. |
| 2009/0120511 A1 | | 5/2009 | Weingarten |
| 2009/0129530 A1 | | 5/2009 | Reyes, Jr. et al. |
| 2009/0129531 A1 | | 5/2009 | Reyes, Jr. et al. |
| 2009/0279657 A1 | * | 11/2009 | Kwon .......... G21C 15/18 376/282 |
| 2010/0278294 A1 | | 11/2010 | Kwon et al. |
| 2011/0197976 A1 | | 8/2011 | Weingarten |
| 2012/0177168 A1 | | 7/2012 | Reyes, Jr. et al. |
| 2012/0207260 A1 | | 8/2012 | Houghton et al. |
| 2012/0243651 A1 | | 9/2012 | Malloy |
| 2012/0294408 A1 | | 11/2012 | Reyes, Jr. et al. |
| 2012/0321030 A1 | | 12/2012 | Malloy |
| 2013/0301782 A1 | | 11/2013 | Malloy, III |
| 2013/0336440 A1 | | 12/2013 | Memmott et al. |
| 2013/0336441 A1 | | 12/2013 | Cronje et al. |
| 2014/0016733 A1 | | 1/2014 | Kim |
| 2014/0016734 A1 | | 1/2014 | Moon et al. |
| 2014/0050292 A1 | | 2/2014 | Kim et al. |
| 2014/0270044 A1 | | 9/2014 | Watson et al. |
| 2015/0243386 A1 | | 8/2015 | No |

FOREIGN PATENT DOCUMENTS

| | | | |
|---|---|---|---|
| DE | 3138907 C1 | | 2/1983 |
| EP | 2096644 A2 | | 9/2009 |
| JP | H03042595 A | | 2/1991 |
| JP | H0738659 U | * | 7/1995 |
| JP | H08201559 A | | 8/1996 |
| JP | 2001183487 A | | 7/2001 |
| JP | 2009210283 A | | 9/2009 |
| KR | 100856501 B1 | | 9/2008 |
| WO | 2012158459 A1 | | 11/2012 |

OTHER PUBLICATIONS

Extended European Search Report dated Jan. 2, 2017 for EP Application No. 14779191.7.

First Office Action dated Oct. 10, 2016 for Chinese Application No. 201480022184X.

Hoeve, John E., and Mark Z. Jacobson. "Worldwide health effects of the Fukushima Daiichi nuclear accident." Energy & Environmental Science 5.9 (2012): 8743-8757. (Year: 2012).

International Search Report for PCT/US2014/018268 dated Jun. 6, 2014.

Japanese Office Action, JP Application No. 2016-500378, dated Jan. 4, 2018, 5 pages.

Seul, Kwang Won, Young Seok 5b4Bang, and Hho Jung Kim. "Evaluation of the gravity-injection capability for core cooling after a loss-of-SDC event." Proceedings of the Korean Nuclear Society Conference. Korean Nuclear Society, 1999.<https://www.kns.org/files/pre_paper/29/99S-114.PDF>. (Year: 1999).

* cited by examiner

REFUELING WATER STORAGE TANK (RWST) WITH TAILORED PASSIVE EMERGENCY CORE COOLING (ECC) FLOW

CROSS-REFERENCE TO RELATED APPLICATIONS

This application is a divisional of U.S. patent application Ser. No. 14/169,192, filed Jan. 31, 2014, now U.S. Pat. No. 11,373,768, which claims the benefit of U.S. Provisional Patent Application No. 61/777,026 filed Mar. 12, 2013, titled "REFUELING WATER STORAGE TANK (RWST) WITH TAILORED EMERGENCY CORE COOLING (ECC) FLOW", and U.S. Provisional Patent Application No. 61/794,206, filed Mar. 15, 2013, titled "PASSIVE TECHNIQUES FOR LONG-TERM REACTOR COOLING", the disclosures of which are hereby incorporated by reference in their entirety.

GOVERNMENT SUPPORT CLAUSE

This invention was made with Government support under Contract No. DE-NE0000583 awarded by the Department of Energy. The Government has certain rights in the invention.

BACKGROUND

The following relates to the nuclear power generation arts, nuclear reactor safety arts, nuclear reactor emergency core cooling (ECC) arts, and related arts.

In a loss of coolant accident (LOCA), or other event in which a nuclear reactor is rapidly depressurized, the nuclear reactor core is to be kept immersed in water so as to provide for removal of decay heat and to prevent fuel rod clad damage and subsequent failure of the fuel rod as a fission product barrier. The system that provides for core cooling following a LOCA is the emergency core cooling system (ECC). The ECC design may incorporate passive features that can be actuated using stored energy and do not continue to use electric power after actuation. In this kind of passive ECC design, a refueling water storage tank (RWST) is typically located inside radiological containment to provide water for use during reactor refueling, and this RWST also serves as a water source for the ECC system. The RWST is located above the reactor core so that the passive ECC system can operate by gravity-driven water flow.

The RWST is sized to provide sufficient water to operate the ECC system for a design-basis time period, e.g. 72 hours in some scenarios. Depressurization valves allow gravity-driven flow (or injection) of water from the RWST into the reactor. Boiling heat transfer removes decay heat generated in the fuel assemblies and the resulting steam is subsequently vented through depressurization lines. The required RWST volume can be computed based on the latent heat capacity of water (i.e., the amount of thermal energy that is removed per liter of liquid water converted to steam), the known reactor core decay heat output versus time, and the chosen design-basis time period for ECC operation starting with a fully-filled RWST.

BRIEF SUMMARY

In one disclosed aspect, an apparatus comprises: a nuclear reactor comprising a pressure vessel containing a nuclear reactor core comprising fissile material; a refueling water storage tank (RWST); an injection line connected to drain water from the RWST to the pressure vessel; and a standpipe having a lower end in fluid communication with the injection line and having two or more orifices at different heights along the standpipe in fluid communication with the RWST. In some embodiments the standpipe is disposed in the RWST and has two or more orifices at different heights along the standpipe. In some embodiments the standpipe is disposed outside of the RWST and has two or more orifices at different heights along the standpipe connected with the RWST via cross-connection pipes. Some embodiments further comprise a float valve configured to regulate flow through one of the two or more orifices, the float valve including a float disposed in the standpipe. In some embodiments the standpipe including the two or more orifices is configured to tailor flow from the RWST to the pressure vessel to approximate an expected decay heat versus time profile.

In another disclosed aspect, a method comprises depressurizing the pressure vessel of a nuclear reactor, and providing cooling of the nuclear reactor core by operations including draining water from a refueling water storage tank (RWST) into a standpipe and draining water from the standpipe into the depressurized pressure vessel. In some embodiments the draining of water from the RWST into the standpipe comprises draining water from the RWST into the standpipe through orifices at two or more different elevations along the drainpipe. In some embodiments the draining of water from the RWST into the standpipe comprises: draining water from the RWST into the standpipe through a first orifice along the drainpipe; draining water from the RWST into the standpipe through a second orifice along the drainpipe; and controlling the draining of water from the RWST into the standpipe through the second orifice using a float valve having its float disposed in the standpipe at an elevation that is lower than the elevation of the first orifice.

In another disclosed aspect, an apparatus comprises a nuclear reactor comprising a pressure vessel containing a nuclear reactor core comprising fissile material, a refueling water storage tank (RWST), and a reactor core cooling system which comprises: a standpipe including a plurality of orifices in fluid communication with the RWST to drain water from the RWST into the standpipe; and an injection line configured to drain water from the standpipe to the pressure vessel. In some embodiments the RWST is not in fluid communication with the pressure vessel during operation of the reactor core cooling system except through the standpipe. In some embodiments the standpipe is disposed in the RWST. In some embodiments the standpipe is disposed outside of the RWST and the reactor core cooling system further includes cross-connection pipes connecting the plurality of orifices with the RWST. In some embodiments the reactor core cooling system further comprises a valve configured to control flow through one orifice of the plurality of orifices in fluid communication with the RWST based on water level in the standpipe. In some such embodiments the valve comprises a float valve having its float disposed in the standpipe.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
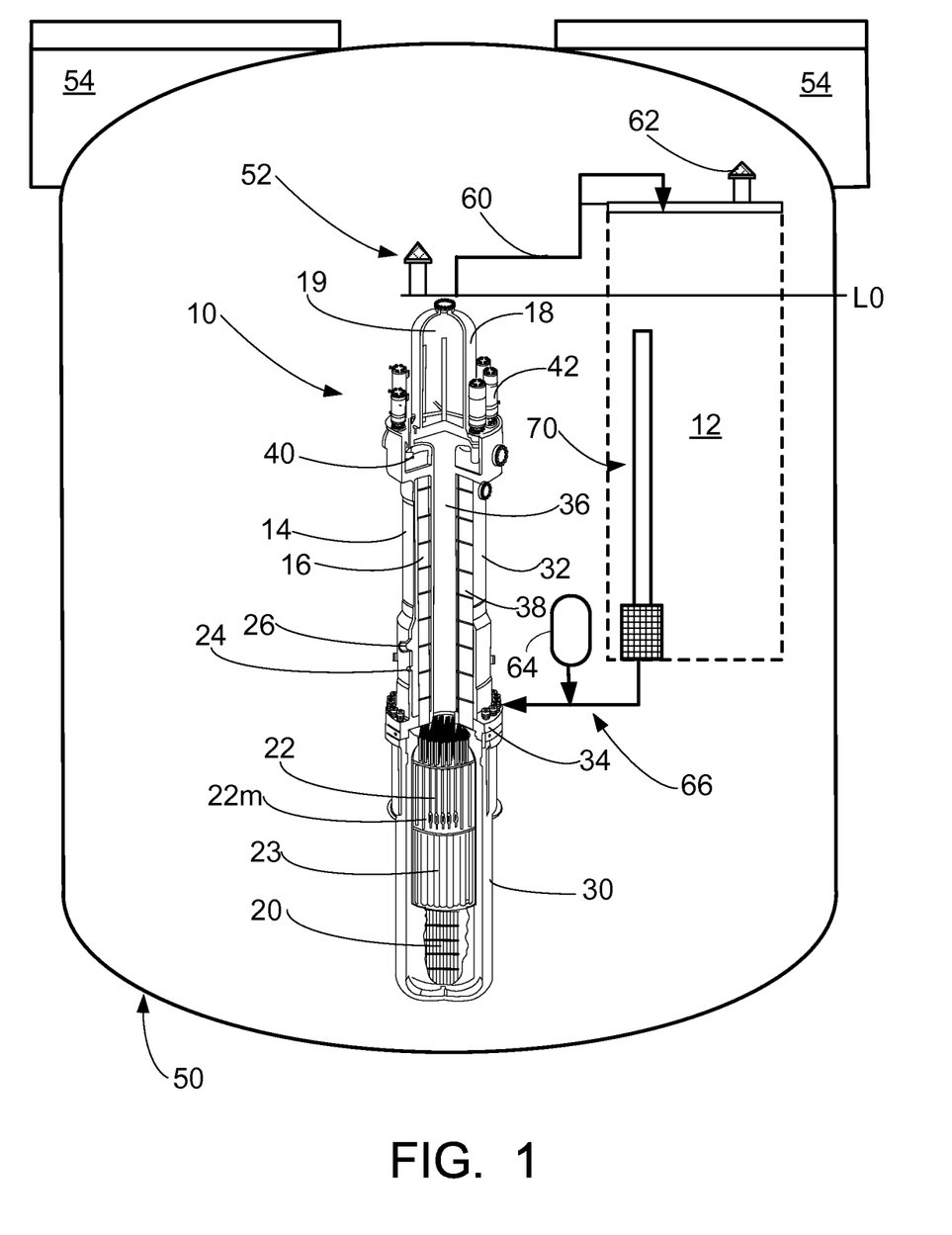
FIG. 1 shows a diagrammatic cutaway perspective view of an illustrative small modular reactor (SMR) disposed in a radiological containment structure along with a refueling water storage tank (RWST) with an emergency core cooling (ECC) system utilizing the RWST coupled with the reactor via a flow-tailoring standpipe.

With reference to FIG. 1, a cutaway perspective view is shown of an illustrative small modular reactor (SMR) 10 with which the disclosed emergency core cooling (ECC) techniques with tailored passive flow from one or more refueling water storage tank (RWST) units 12 are suitably employed. The illustrative SMR unit 10 of FIG. 1 is of the pressurized water reactor (PWR) variety, and includes a pressure vessel 14 and one or more integral steam generators 16 disposed inside the pressure vessel 14 (that is, the illustrative SMR 10 is an integral PWR 10). The illustrative SMR 10 of FIG. 1 is merely an example, and more generally the disclosed ECC techniques with tailored passive flow from one or more RWSTs are suitably employed with substantially any type of light water nuclear reactor, including PWRs (both integral as shown, and PWR configurations employing external steam generators), boiling water reactors (BWRs), and so forth. The disclosed ECC techniques with tailored passive flow from one or more RWSTs are also not limited to small and/or modular nuclear reactors, but rather may also be employed with larger-scale and/or non-modular reactor units. The illustrative SMR 10 of FIG. 1 includes an integral pressurizer 18 defining an integral pressurizer volume 19 at the top of the pressure vessel 14; however, again, more generally the disclosed ECC techniques with tailored passive flow from one or more RWSTs are suitably employed with light water nuclear reactors including either integral or external pressurizers.

In general, the nuclear reactor (such as the illustrative SMR 10 of FIG. 1) includes a pressure vessel 14 containing a nuclear reactor core 20 comprising fissile material such as $^{235}$U (typically in an alloy, composite, mixture, or other form) immersed in (primary) coolant water (more generally herein, simply "coolant" or "coolant water"). With the reactor core 20 immersed in coolant water, and when control rod drive mechanisms (CRDMs) 22 at least partially withdraw control rods made of neutron-absorbing material, a nuclear chain reaction is initiated in the nuclear reactor core which heats the (primary) coolant water. The illustrative CRDMs 22 are internal CRDMs, in which the CRDM unit including its motor 22$m$ including both rotor and stator are disposed inside the pressure vessel 14, and guide frame supports 23 guide the portions of the control rods located above the core; in other embodiments, external CRDM units may be employed. In the illustrative integral PWR 10, a separate water flow (secondary coolant) enters and exits the steam generators 16 via feedwater inlet 24 and steam outlets 26, respectively. The secondary coolant flows through secondary coolant channels of the steam generator or generators 16, and is converted to steam by heat from the reactor core carried by the (primary) coolant water. The steam generator(s) 16 thus act as a heat sink for the nuclear reactor 10. In other reactor types, such heat sinking is obtained by a different mechanism. For example, in a PWR with external steam generators, the primary coolant is piped out of the pressure vessel to the external steam generator where it converts secondary coolant flow to steam. In a BWR, the primary coolant is boiled to form steam inside the pressure vessel and this primary coolant steam directly drives a turbine or other useful apparatus. The pressure vessel 14 of the illustrative integral PWR 10 includes a lower portion 30 housing the nuclear reactor core 20 and an upper portion 32 housing the steam generators 16, with a mid-flange 34 connecting the upper and lower portions of the pressure vessel. The primary coolant flow circuit inside the pressure vessel 14 is defined by a cylindrical central riser 36 extending upward above the reactor core 20 and a downcomer annulus 38 defined between the central cylindrical riser 36 and the pressure vessel 14. The flow may be driven by natural circulation (i.e. by primary coolant heated by the reactor core 20 rising through the central cylindrical riser 36, discharging at the top and flowing downward through the downcomer annulus 38), or may be assisted or driven by reactor coolant pumps (RCPs), such as illustrative RCPs including RCP casings 40 containing impellers driven by RCP motors 42. The RCPs may alternatively be located elsewhere along the primary coolant path, or omitted entirely in a natural circulation reactor. It is again noted that the illustrative SMR 10 is merely an illustrative example, and the disclosed ECC techniques are suitably employed with substantially any type of light water nuclear reactor.

With continuing reference to FIG. 1, a diagrammatic sectional view is shown of the SMR 10 disposed in a radiological containment structure 50 (also referred to herein as "radiological containment" or simply "containment") along with the refueling water storage tank (RWST) 12. While a single RWST 12 is illustrated, it is to be understood that two or more RWSTs may be disposed inside containment to provide redundancy and/or to provide a larger total volume of water. The RWST 12 serves multiple purposes. As the name implies, is provides water for use during routine refueling (that is, removal of spent fuel comprising the nuclear reactor core and its replacement with fresh fuel). The RWST 12 also serves as a water reserve for use during certain accident scenarios, such as a loss of heat sinking event in which the heat sinking via the steam generators 16 or other heat sinking pathway is interrupted causing the pressure and temperature in the reactor pressure vessel 14 to rise; or a loss of coolant accident (LOCA) in which a break occurs in a (relatively large-diameter) pipe or vessel penetration connected with the pressure vessel 14.

FIG. 1 diagrammatically illustrates the response to a LOCA comprising a break from which steam 52 (possibly in the form of a two-phase steam/water mixture 52) escapes. In FIG. 1 such a LOCA is diagrammatically indicated as originating in the proximity of the integral pressurizer 18 at the top of the pressure vessel 14. The steam/water 52 that escapes from the pressure vessel 14 is contained by the radiological containment 50, and the released energy is ejected to an ultimate heat sink (UHS) 54 via a suitable transfer mechanism. In illustrative FIG. 1, this heat transfer is achieved (at least in part) by direct thermal contact between the UHS 54 which is located on top of and in thermal contact with the top of the containment 50.

Additionally, a passive emergency core cooling (ECC) is activated, which depressurizes the reactor 10 using valves connected to the pressurizer 18 (in the illustrative example of FIG. 1, or elsewhere in other reactor design) to vent the pressure vessel to the RWST. This operation is diagrammatically indicated by steam path 60 carrying steam (or two-phase steam/water mixture) from the pressurizer 18 to sparge into the top of the RWST 12. Any excess pressure in the RWST 12 resulting from the venting of the pressure vessel to the RWST escapes via a steam vent 62 from the RWST. While depressurizing the reactor, water is initially injected into the reactor vessel from two, nitrogen pressurized, intermediate pressure injection tanks (IPIT, of which one illustrative IPIT 64 is shown in FIG. 1) to assure the reactor core 20 remains immersed in coolant water. The water from the IPIT 64 optionally includes boron or another neutron poison to facilitate rapid shutdown of the nuclear chain reaction. Once the reactor 10 is depressurized, water in the RWST 12 (or RWSTs, if two or more redundant RWST units are provided inside containment) drains into the reactor vessel 14 via an injection line 66 running from the RWST 12 to the reactor pressure vessel, thus refilling the vessel 14. (Note that in illustrative FIG. 1, a downstream portion of the injection line 66 also provides the input path for water from the IPIT 64, in which case there is suitable valving, provided to valve off the IPIT 64 after initial depressurization is complete. The valving is optionally passive, e.g. automatically closing when the pressure in the pressure vessel 14 falls below a setpoint. It is also contemplated to connect the IPIT with the reactor pressure vessel via a separate line from the injection line 66.) The water in the RWST(s) 12 provides long-term cooling for the reactor core 20.

The ECC response to a loss of heat sinking event is similar, except that coolant is not lost via a LOCA break, but rather the loss of heat sinking causes the pressure in the pressure vessel 14 to rise above a threshold at which the ECC activates to depressurize the pressure vessel 14.

The flow of water from the RWST(s) 12 refills the reactor vessel 14. In some calculations for a LOCA in an SMR similar to the illustrative SMR 10 of FIG. 1 employing two RWST units, the water level is calculated to drop to within 50 inches of the top of the reactor core 20, and the escaping primary coolant 52 comprising a mixture of water and steam flows out of the vessel 14 through the break in the pressurizer 18. Over a period of hours, the water level in the RWSTs 12 is calculated to drop, but the analysis shows that the water level in the reactor pressure vessel 14 remains high. Without being limited to any particular theory of operation, it is believed that this is due to a lower density of the water above the reactor core 20 due to saturated conditions and steam in the central riser 36. As a result, a significant amount of water flows out through the break (that is, the integrated volume flow 52 is high), causing the RWST 12 to drain more quickly than it otherwise would if all the water was converted to steam. In the design basis of the calculations, there is sufficient water in each RWST 12 to remove core decay heat for greater than 72 hours if all of the water is converted to steam. However, liquid water lost through the LOCA break removes only about 10% of the energy that would be removed if an equivalent water mass was converted to steam by the heat in the pressure vessel 14. Therefore, the water carried out of the break has an adverse impact on the decay heat removal capacity of the RWSTs 12.

Figure 2:
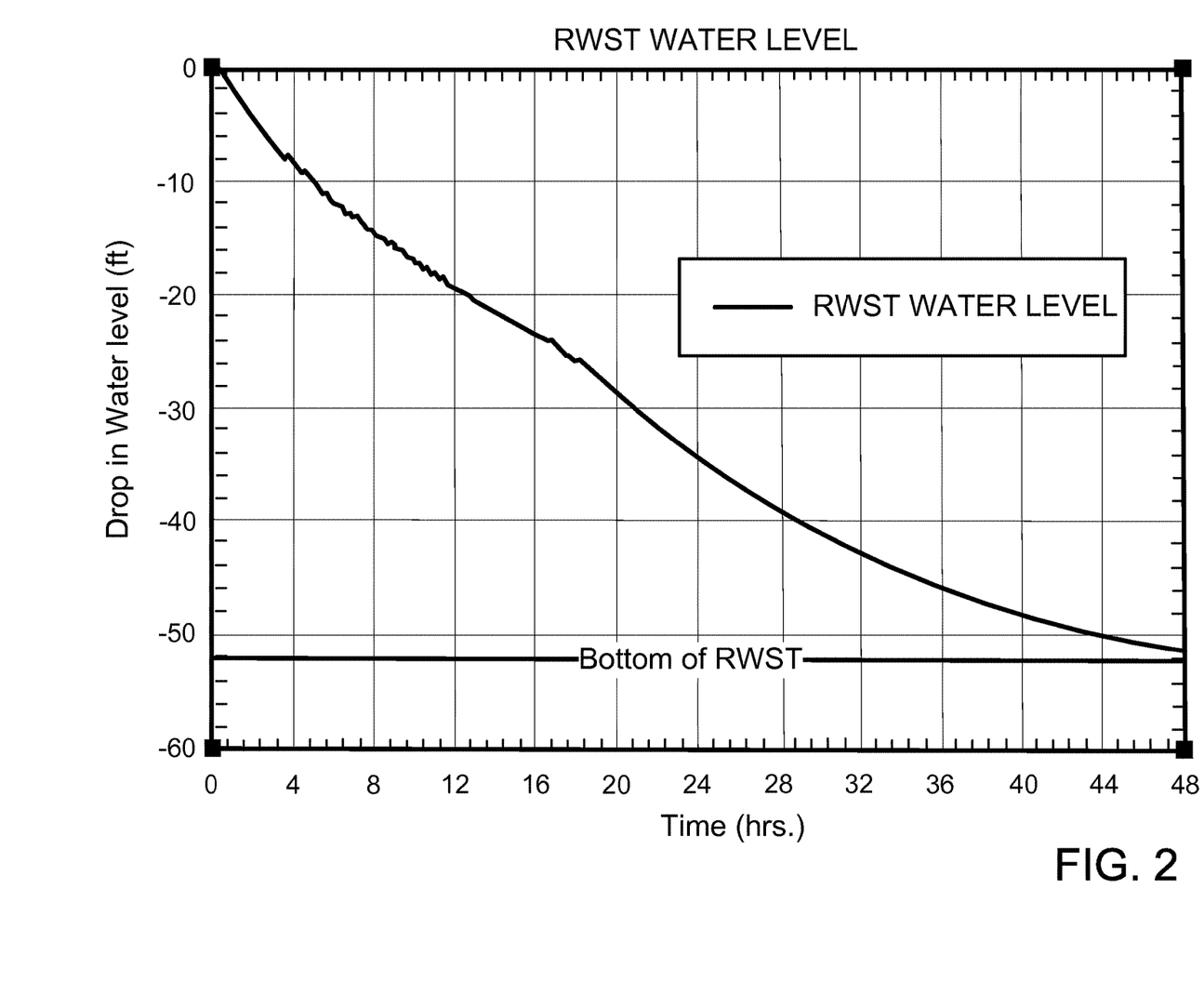
FIG. 2 is a plot of calculated RWST water level after a LOCA (two tanks).

With reference to FIG. 2, excessive water carryover from the break can potentially reduce RWST heat removal capacity to less than the design basis of 72 hours. In the calculations reported in FIG. 2, the RWST 12 was drained of water in only about 48 hours, which is much less than the design basis of 72 hours.

Figure 3:
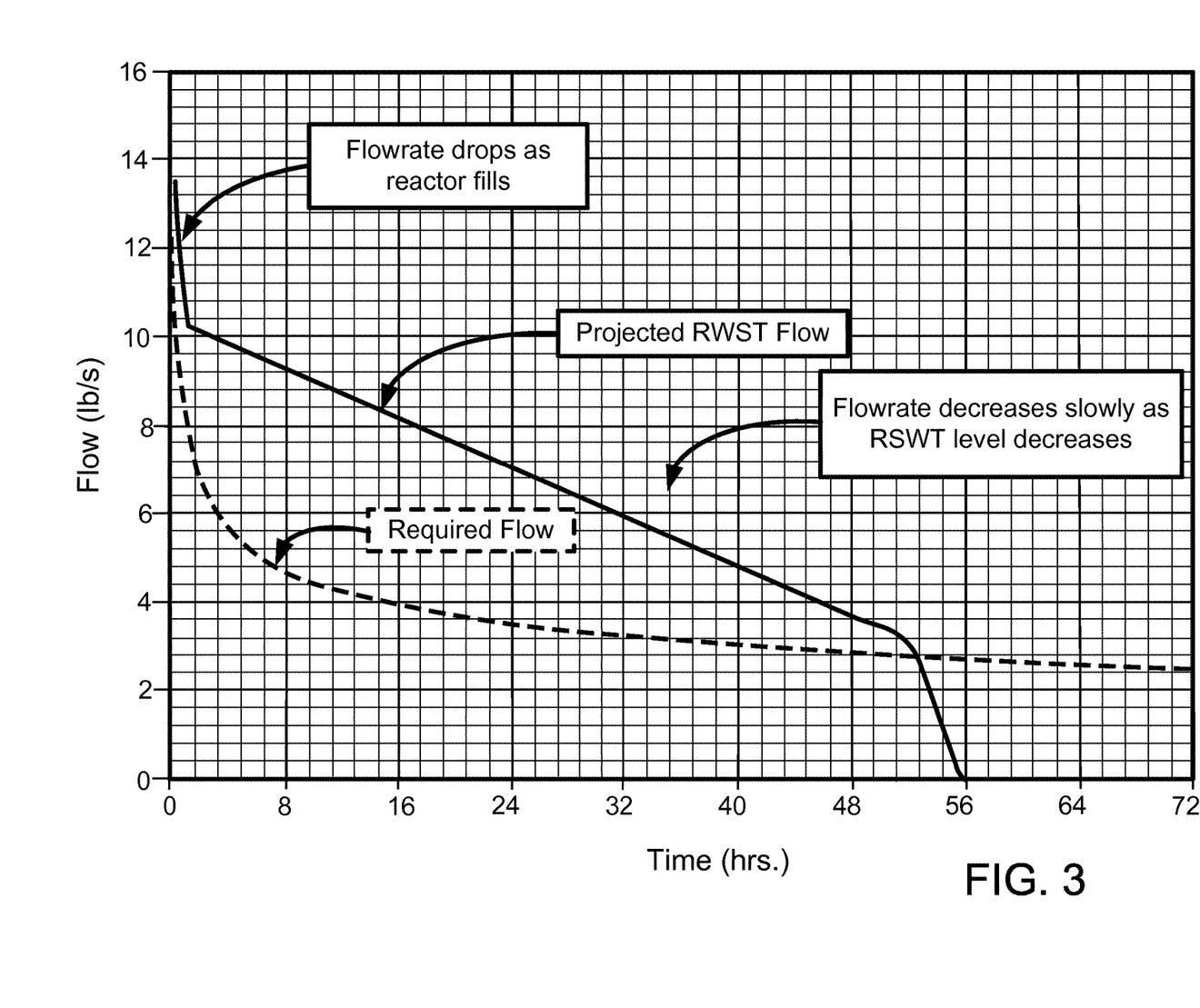
FIG. 3 is a plot of calculated RWST flow versus flow calculated to be needed for decay heat removal.

With reference to FIG. 3, one approach for improving RWST energy removal capacity while retaining passive operation might be to limit the flow of water from the RWST using an orifice (i.e. constriction, not shown) in the injection line running from the RWST to the reactor pressure vessel. Adding fluid flow resistance to the RWST injection line reduces flow potential and, thereby, reduces the carryover of water through the break. However, the orifice cannot be made so small that the flow at any time over the (design basis 72 hour) ECC operation decreases below a required flow sufficient to provide a minimum decay heat removal rate. FIG. 3 shows calculated results using this approach, assuming only one of (redundant) two RWSTs is performing the ECC operation. Initially, the driving head is high because of the high initial RWST level (assumed to start at the 82 foot level in these calculations) and the low water level in the reactor pressure vessel. As the pressure vessel fills, however, the driving head is reduced, lowering the flow. At this point, the flow from the RWST decreases almost linearly as seen in FIG. 3, resulting in an excessive flow for the first 50 hours. At that point, the RWST is essentially empty and cooling is lost, and the design goal of 72 hours is not achieved.

Figure 4:
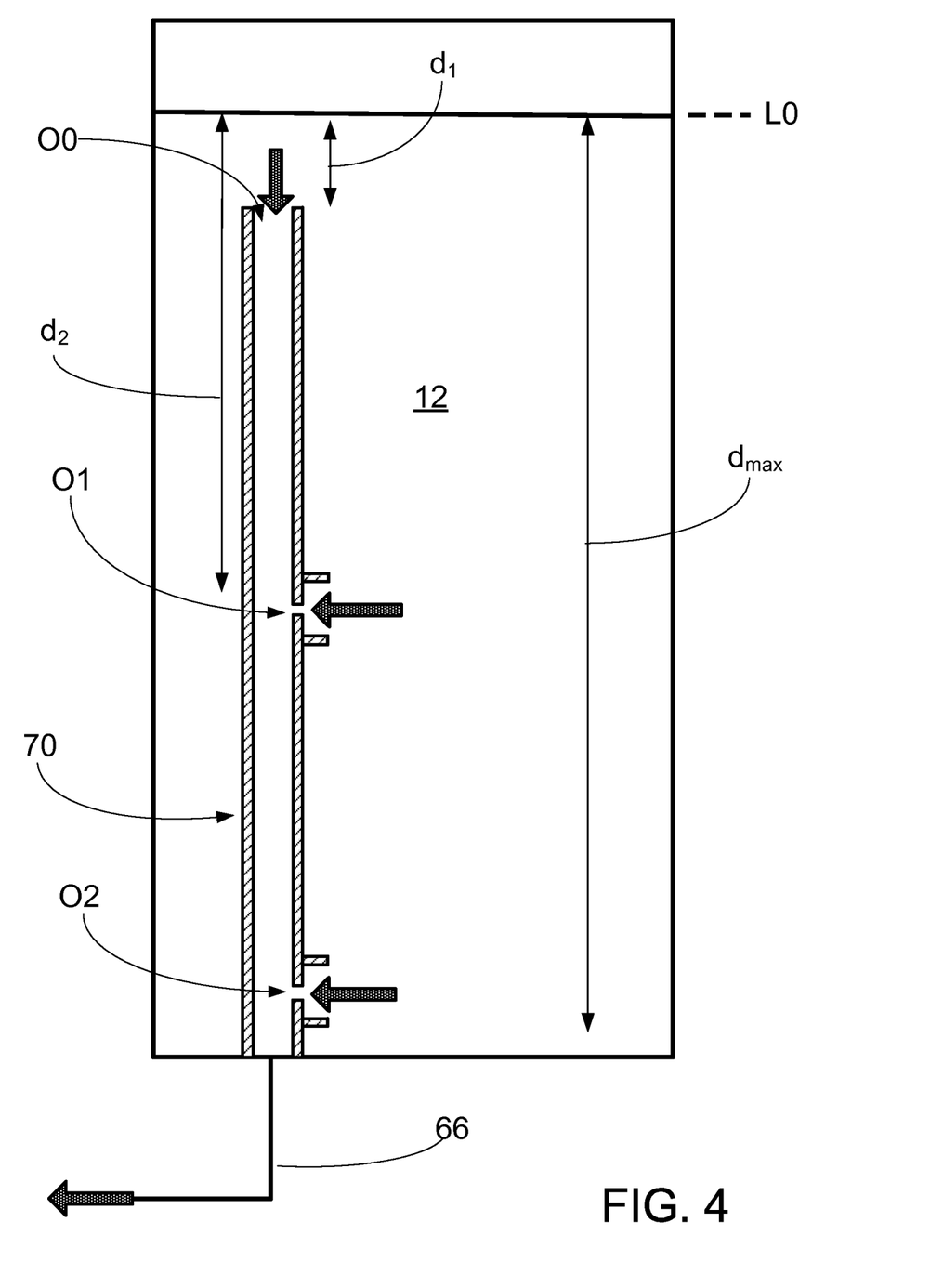
FIG. 4 is a diagrammatic sectional view of the RWST including a standpipe as disclosed herein, with the water in the RWST at its initial level at the beginning of an emergency core cooling (ECC) operation.
Figure 5:
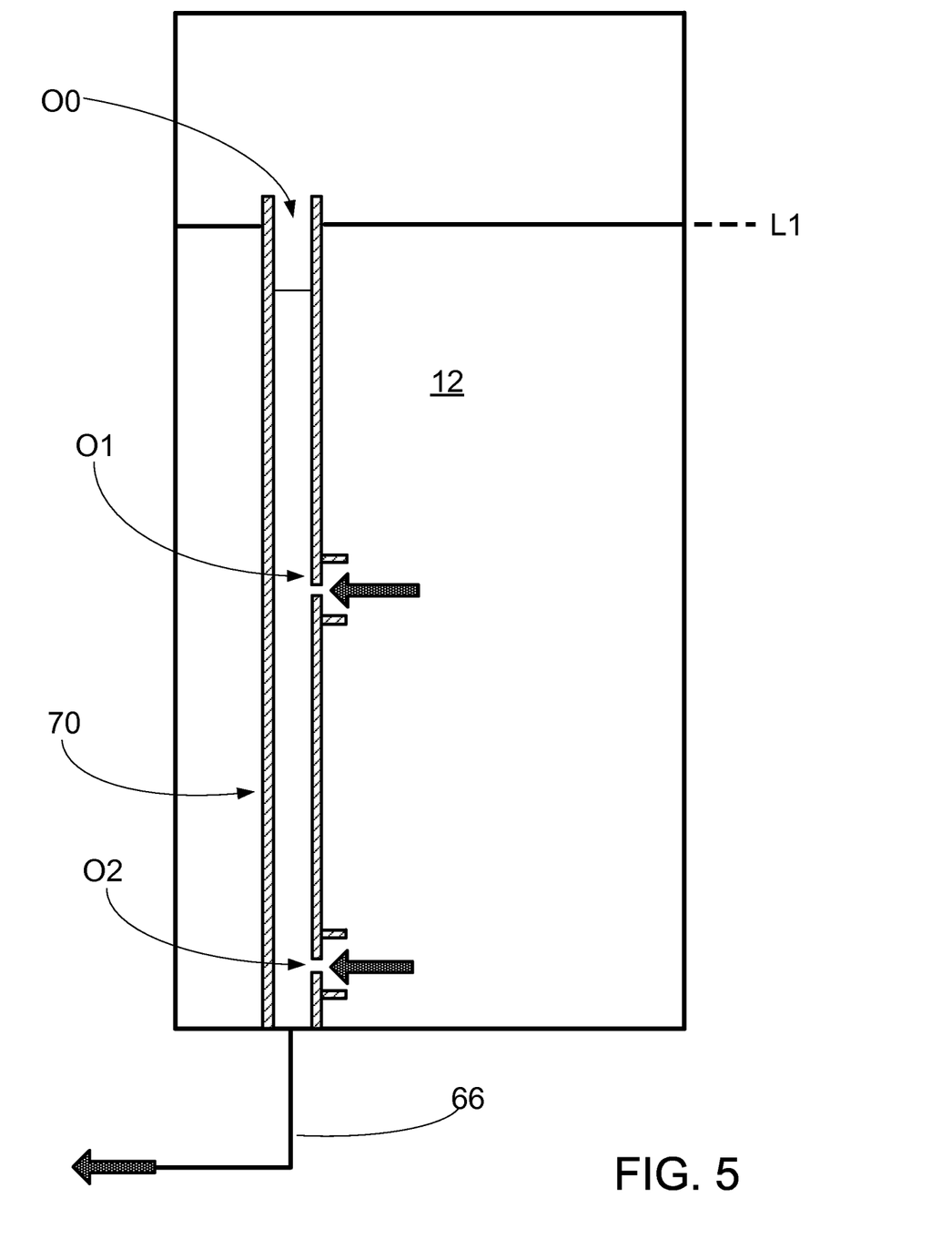
FIG. 5 is the same view as FIG. 4 but after a time into the ECC operation sufficient to lower the water level below the top of the standpipe.

With returning reference to FIG. 1 and with further reference to FIGS. 4 and 5 which show detail drawings of the RWST 12 and injection line 66 at the beginning of the ECC process (FIG. 4) and partway through the ECC process (FIG. 5), an approach that provides tailored passive ECC flow is described. The goal is to tailor the flow from the RWST 12 into the pressure vessel 14 as a function of time to approximately match the decay heat versus time profile. The approach uses a stand pipe 70 disposed in the RWST 12. The lower end of the standpipe 70 feeds into the injection line 66 running from the RWST 12 to the reactor pressure vessel 14 (see FIG. 1). The upper end of the standpipe 12 extends to a height that is a depth $d_1$ below the initial (and hence highest) water level L0 of the RWST 12 (see FIG. 4). In the illustrative example shown in FIG. 1, the initial water level L0 also coincides with the top of the pressurizer 18—this is not required, but has the advantage of providing the maximum water head while avoiding the possibility of unpressurized liquid water from the RWST 12 overflowing from a vessel break at the top of the pressurizer 18.

With particular reference to FIGS. 4 and 5, the standpipe 70 includes multiple orifices O0, O1, O2 each of which admits water into the standpipe 70 so long as the water level in the RWST 12 is above the orifice. In illustrative FIGS. 4 and 5, the orifices include: an orifice O0 which is the opening at the top of the standpipe 70 located at depth $d_1$ below the initial water level L0 of the RWST 12; an orifice O1 located at a depth $d_2$ below the initial water line L0; and an orifice O2 located at or near the bottom of the standpipe 70 and hence at the maximum depth $d_{max}$ below the initial water level L0. Without loss of generality, the illustrative orifices O0, O1, O2 are thus located at respective depths $d_1$, $d_2$, $d_{max}$ below the initial water level where $d_1 < d_2 < d_{max}$. All water draining from the RWST 12 to the pressure vessel 14 via the injection line 66 flows through the stand pipe 70.

When the ECC begins operation, the water level is at the (highest) initial water level L0, as shown in FIG. 4, and so all three orifices O0, O1, O2 are below the water level. Thus, initially water flows through all three orifices O0, O1, O2 creating a high water flow. As RWST 12 is gradually depleted as the ECC operation continues, the water level decreases. Water flow through the upper orifice O0 decreases faster than through the lower orifice O1 which decreases faster than flow through the lowermost orifice O2 because the relative heads drop more quickly for the orifices located higher up along the standpipe 70.

With particular reference to FIG. 5, once RWST water level drops below the top of the standpipe 70 (that is, drops a depth $d_1$ from the initial water level L0 to a lower water level L1 see FIG. 5), there is no flow at all through the uppermost orifice O0. When the water level drops below the orifice O1 (that is, drops a depth $d_2$ from the initial water level, not illustrated), there is no flow at all through orifice O1. Flow continues through the lowermost orifice O2 until the RWST 12 is substantially completely drained.

Figure 6:
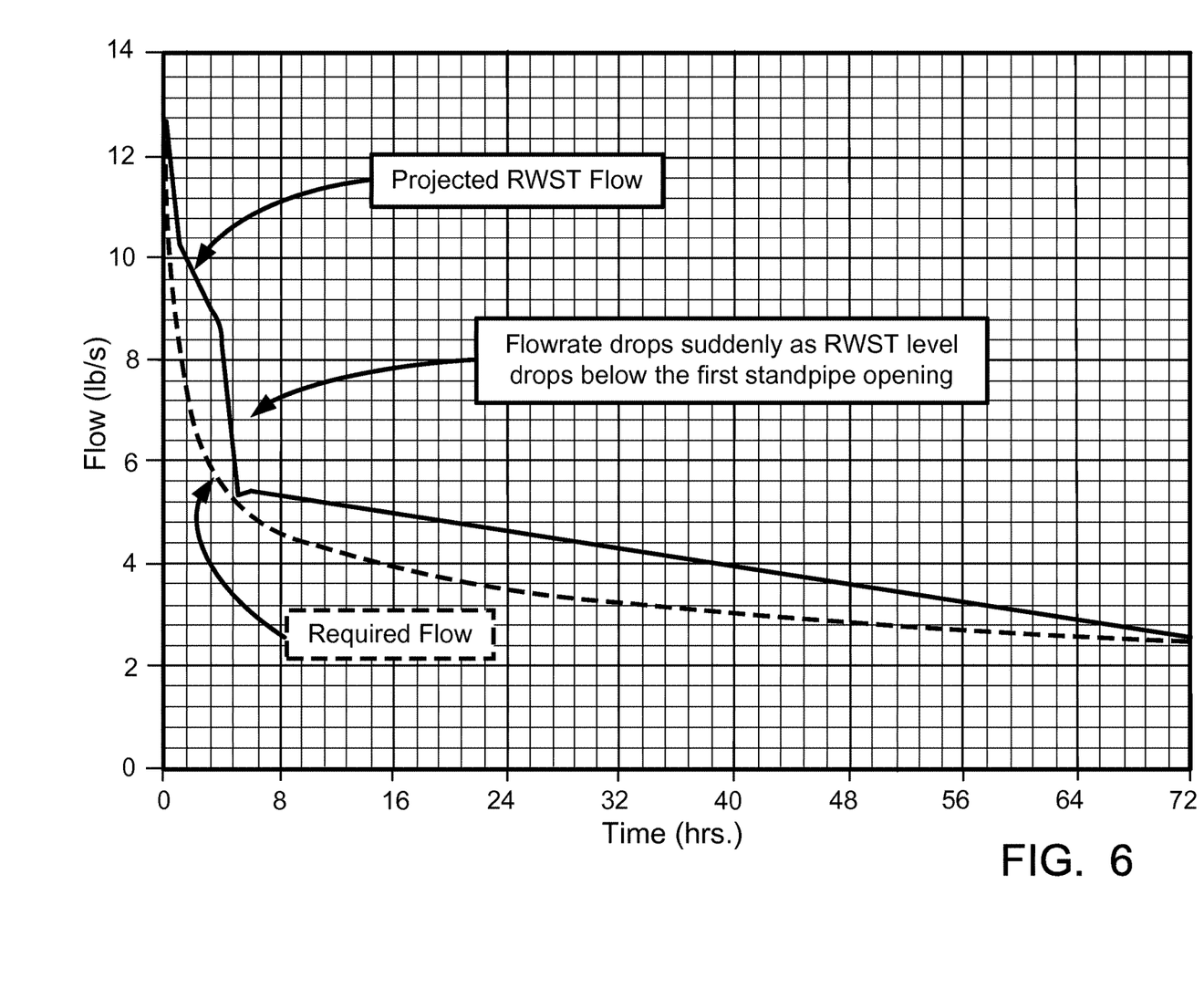
FIG. 6 is a plot of calculated RWST flow through the standpipe of FIGS. 4 and 5 versus flow calculated to be needed for decay heat removal.

With reference to FIG. 6, the flow profile through the standpipe 70 is illustrated for a calculated design. By suitable selection of the depths $d_0$, $d_1$ respective to the maximum depth $d_{max}$ of the RWST 12, and optionally by also optimizing the sizes of the orifices O0, O1, O2, the flow as a function of time can be tailored to closely match the decay heat profile, so that the flow over the entire relevant time (namely a design basis of 72 hours for the design of FIG. 6) remains at or above the minimum required flow, while not draining the RWST 12 over the design-basis 72 hour interval. Indeed, the flow through the standpipe 70 in these calculations provided excess flow throughout the 72 hour ECC operation. The flow profile closely matches the required flow, allowing decay heat to be removed over a longer period of time.

Figure 7:
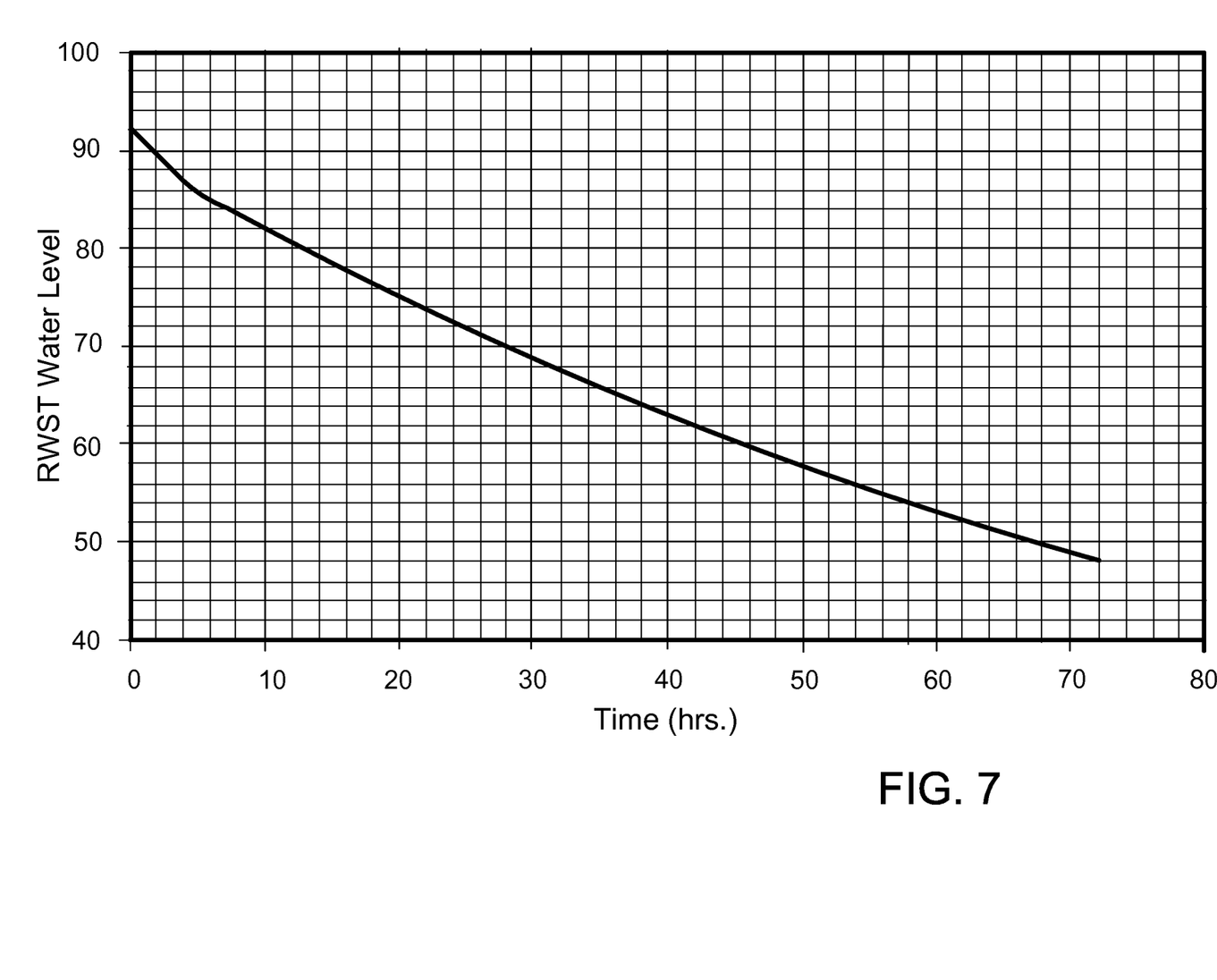
FIG. 7 is a plot of calculated RWST level versus time using the RWST including standpipe of FIGS. 4 and 5.

With reference to FIG. 7, the use of the standpipes 70 in the RWST 12 passively tailors the flow of water from the RWST 12 as a function of time to minimize the loss of water out of the pipe break. This allows a single RWST 12 to maintain water level inside the reactor vessel for a longer period of time. FIG. 7 shows the estimated RWST level, assuming only one tank is used and assuming no internal changes are made to the reactor to minimize water loss through the pipe break. With a tank bottom elevation ($d_{max}$) of 41 ft used in the calculations, there is still seven feet, or 22,400 gal of water in the RWST (single side) after 72 hours. By comparison, without using the standpipe 70 and using two RWST units (not just one RWST unit as in the simulation of FIG. 7), the RWST tanks are completely drained in only 48 hours.

Illustrative FIGS. 4 and 5 employ a single standpipe 70 with three orifices O0, O1, O2. More generally, more than one standpipe can be used to provide redundancy and/or additional flow (with the lower-end outputs of the standpipes coupled in parallel with the injection line 66 leading to the pressure vessel 14). The skilled artisan can readily optimize the number of standpipes and the number, size, and locations of orifices. As few as two orifices can be employed (e.g., orifices O0 and O2 with the intermediate orifice O1 omitted; it is also contemplated for the uppermost orifice to be located on the side of the standpipe rather than being an open upper end of the standpipe as in illustrative O0). Additional orifices generally allows for more precise tailoring of the flow rate as a function of time. The orifices O0, O1, O2 need not be of the same size. The orifices optionally include screens to limit debris ingress into the standpipe, and the flow resistance of any such screens is suitably taken into account in the design. The orifices may also be configured as longitudinal slits whose long dimension is parallel with the axis of the standpipe—such slits can reduce the abruptness of the transient as the decreasing water level passes the orifice (e.g., as in the abrupt transition labeled in FIG. 6). Some reduced abruptness can also be achieved by additionally or alternatively tilting the standpipe away from the illustrated vertical orientation. Another parameter that can be adjusted to tailor the flow rate as a function of time is to vary the diameter of the standpipe over its height.

Figure 8:
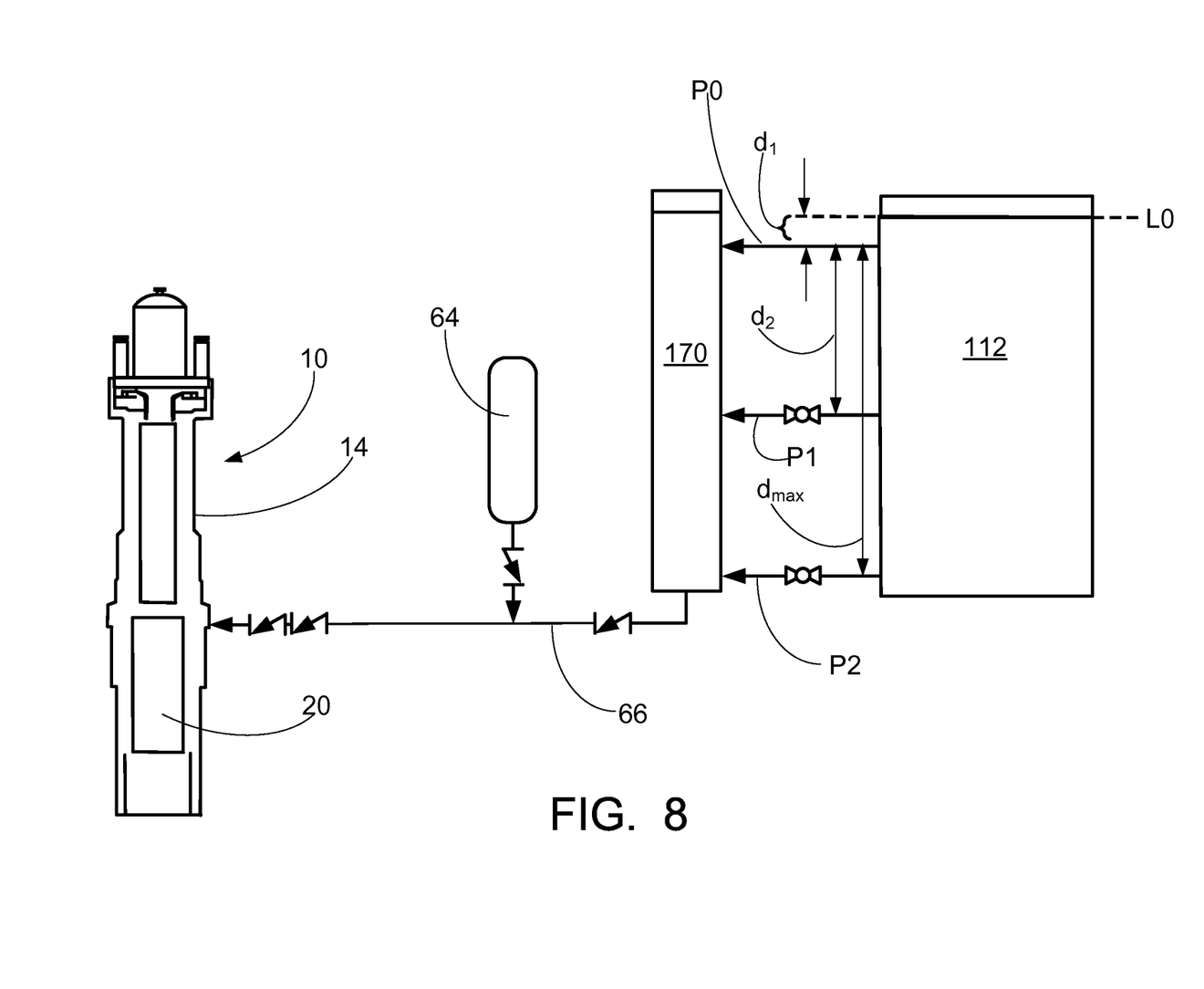
FIG. 8 diagrammatically shows a variant embodiment in which the flow-tailoring standpipe is located outside of the RWST.

With reference to FIG. 8, in a variant embodiment including a modified RWST 112 and a standpipe 170 that is located outside of the RWST 112. As shown in FIG. 8, the ECC system of FIG. 8 is in the same context as the ECC system of FIGS. 4 and 5, e.g. the ECC of FIG. 8 operates to provide tailored flow of water into the nuclear reactor 10 to provide core cooling and to ensure the reactor core 20 remains immersed in water during the decay heat removal. Toward this end, water flows from the RWST 112 through the standpipe 170 and into the pressure vessel 14 via the injection line 66. In illustrative FIG. 8, the injection line 66 again also serves as the injection line for the illustrative IPIT 64 (although as already mentioned in reference to FIG. 1, the IPIT could be connected via a separate injection line).

The ECC system of FIG. 8 differs from that of FIGS. 4 and 5 in that the standpipe 170 is located outside of the RWST 112. (By contrast, in the embodiment of FIGS. 4 and 5 the standpipe 70 is disposed inside the RWST 12.) To flow water from the RWST 112 through the externally located standpipe 170, a plurality of cross-connection pipes P0, P1, P2 connect the RWST 112 and the standpipe 170 at the different depths $d_0$, $d_1$, $d_{max}$ (compare with FIG. 4). The cross-connection pipes P0, P1, P2 thus serve the same role as the orifices O0, O1, O2 of the embodiment of FIGS. 4 and 5. The stand pipe 170 is designed to fill to the top of the RWST 112 (that is, to the initial level L0) during normal operation providing the maximum head during initial draining. As water leaves the RWST 112, the water level drops below the level $d_0$ of the first cross-connection pipe P0, resulting in a rapid decrease in water level in the stand pipe. Makeup water to the standpipe 70 is controlled by the one or more orifices O0, O1, O2 at different elevations in the embodiment of FIGS. 4 and 5; analogously, in the embodiment of FIG. 8 makeup water to the standpipe 170 is controlled by the one or more cross-connection pipes P0, P1, P2 at different elevations. In both cases, this produces a significantly lower elevation head forcing water into the reactor vessel 14 as the water level in the RWST 12, 112 falls below the level (i.e. elevation) of each successive orifice or cross-connection pipe. The result is the desired tailored flow of water from the RWST 12, 112 into the pressure vessel 14, with a large head initially to keep the initially hot core 20 cool and immersed in water, and a reduced head over time which is as appropriate as the reactor core 20 cools and requires reduced water injection to remove the steadily decreasing decay heat output and to keep the cooling reactor core immersed in water.

The embodiment of FIG. 8 has certain advantages as compared with the embodiment of FIGS. 4 and 5. The external standpipe 170 is readily accessible to perform maintenance. Valves can also be incorporated into the cross-connection pipes (e.g., redundant parallel valves are shown in the deeper cross-connection pipes P1, P2 of FIG. 8) to facilitate isolation of the standpipe 170 for such maintenance. Such valves could also be used to tailor the head as a function of time to accommodate specific circumstances. For example, during a LOCA if it is found that the water flow from the RWST 112 to the pressure vessel 14 is too high (e.g., as evidenced by excessive liquid water flowing out the LOCA breakage), one or more of the valves on the cross-connection piping can be closed off to reduce the effective head.

On the other hand, the embodiment of FIGS. 4 and 5 has certain advantages, including a more compact design (since the standpipe 70 is disposed inside the RWST 12) and elimination of the cross-connection the piping P0, P1, P2. If multiple standpipes 70 are provided inside the RWST 12 and connected in parallel with the injection line 66, then a real-time manual tailoring of the head similar to that achieved using the valves on the cross-connection pipes P1, P2 can be achieved by providing valves on the individual standpipe-to-injection line connections so as to isolate individual standpipes to modulate the effective head in real-time.

Figure 9:
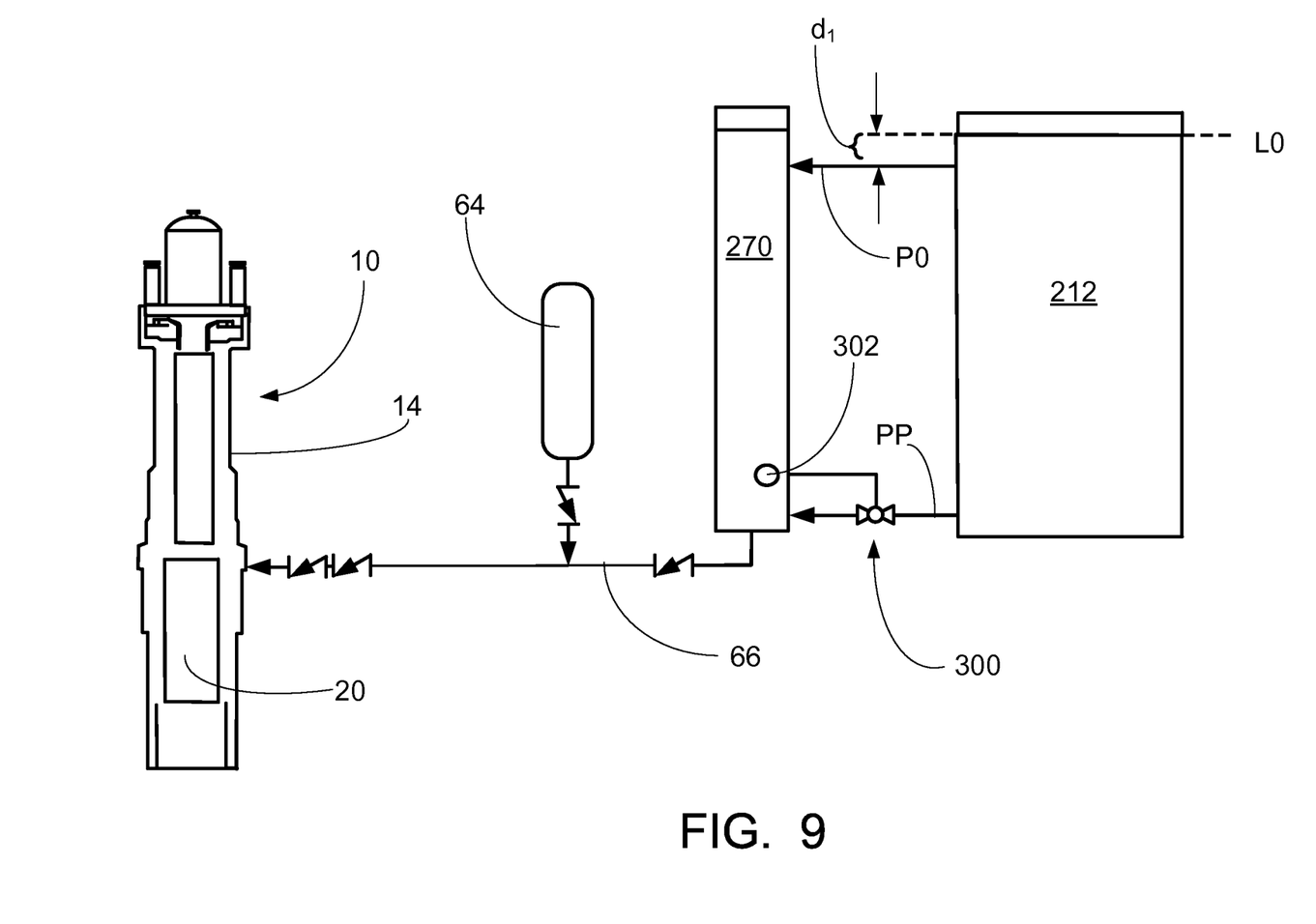
FIG. 9 diagrammatically shows a variant embodiment in which the flow-tailoring standpipe is located outside of the RWST and some flow tailoring is provided by a flow-tailoring float valve.
Figures 10, 11:
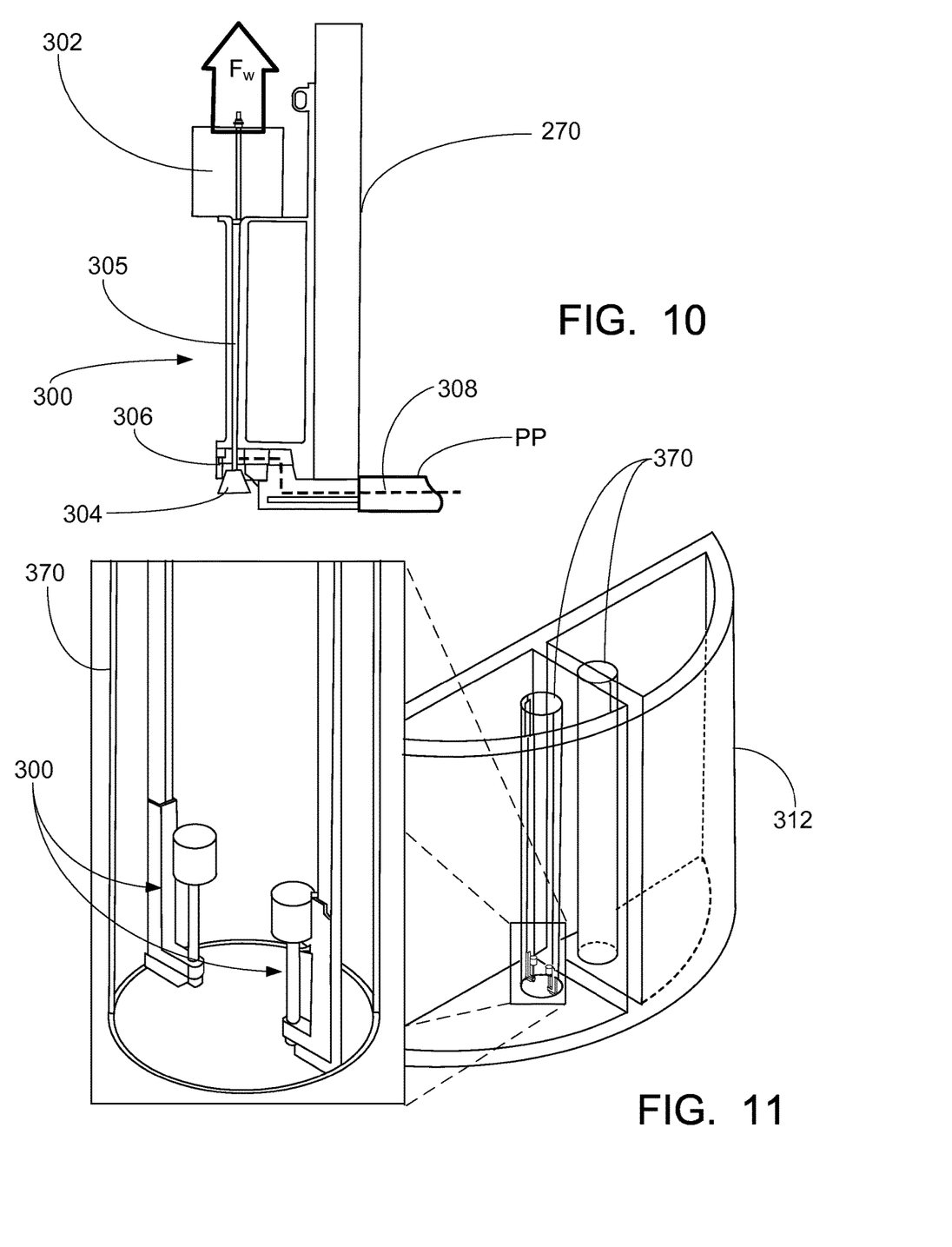
FIG. 10 diagrammatically shows a side view of a suitable embodiment of the flow-tailoring float valve of the system of FIG. 9.
FIG. 11 diagrammatically shows a variant embodiment employing standpipes disposed in the RWST with flow-tailoring float valves.

With reference to FIGS. 9 and 10, another variant embodiment includes a modified RWST 212 and an external standpipe 270. This embodiment includes the topmost cross-connection pipe P0 as in the embodiment of FIG. 8; however, the lower two cross-connection pipes P1, P2 of the embodiment of FIG. 8 are replaced by a single cross-connection pipe PP whose flow is controlled by a float valve 300 having its float 302 disposed in the standpipe 270. Alternatively, another type of passive valve can be employed such as a spring-type valve. Operation of the ECC system of FIG. 9 starts similarly to that of FIG. 8—the topmost cross-connection pipe P0 allows the standpipe 270 to be filled to the same level (initially level L0) as the RWST 212. The cross-connection pipe PP is initially valved closed by the float valve 300 because the high water level raises the float 302 to close the float valve 300. This is indicated diagrammatically in FIG. 10 by the indicated buoyancy force $F_w$ acting on the float 302, which raises a valve body 304 (via a connecting shaft 305) against a valve seat 306 to close the float valve 300. This situation holds until the flow into the pressure vessel 14 causes the water level in the RWST 212 to fall below the topmost cross-connection pipe P0 (that is, to fall by a distance $d_1$). At that point, flow into the standpipe 270 via the topmost cross-connection pipe P0 stops, and the remaining water in the standpipe 270 rapidly flows out through the injection line 66 to the pressure vessel 14. This rapid decrease in water level in the standpipe 270 stops when the water level falls below the level of the float 302 so that the buoyancy force $F_w$ is removed and the float 302 falls downward under gravity causing the valve body 304 to move away from the valve seat 306 so as to allow water flow 308 to flow from the RWST 212 through the lower cross-connection pipe PP into the standpipe 270. The equilibrium state corresponds to a water level just sufficient to provide enough buoyancy to the float 302 so that the inflow of water through the pipe PP and float valve 300 balances the outflow of water through the injection line 66 into the pressure vessel 14. This water level is at about the position of the float 302. Thus, the ECC system of FIGS. 9 and 10 provides a two-level head: a high head during the initial stage of core cooling that continues until the water level in the RWST 212 falls to the level of the topmost cross-connection pipe P0; followed after a brief transition as the bulk of the water in the standpipe 270 flows out by a lower head corresponding to water flow through the pipe PP and the (at least partly) open float valve 300.

It is noted that FIG. 9 diagrammatically shows the float valve 300 in a functional form, by showing the valve 300 diagrammatically valving the cross-connection pipe PP, controlled by the float 302 in the standpipe 270. The physical layout of the float valve 300 can be different, as shown by the illustrative embodiment of the float valve 300 shown in FIG. 10, where the valve components 304, 305, 306 are actually disposed in the standpipe 270, but operate to control the inflow 308 of water from the cross-connection pipe PP into the standpipe 270 (and hence, functionally the valve of FIG. 10 valves flow through the cross-connection pipe PP as shown in the functional diagram of FIG. 9).

If the cross-connection pipe PP and float valve 300 in its fully open position have sufficiently high flow rate, then the water level in the standpipe 270 of the system of FIG. 9 after falling below depth $d_1$ is pinned to the elevation of the float 302, which can be made precise by limiting the maximum travel stroke of the float 302 by suitable mechanical stops. The pinning of the water level at the level of the float 302 is obtained because as the water level in the standpipe 370 rises above the level of the float 302 this closes the float valve 300 resulting in rapid draining of the standpipe 370 via injection line 66 until the water level falls back to the float level. Similarly, if the water level in the standpipe 370 falls below the level of the float 302 this opens the float valve 300 which allows rapid inflow of water from the RWST 312 (assuming low flow resistance) until the water level in the standpipe 370 rises to lift the float 302 and close the float valve 300. This pinning of the water level to the float level assumes the cross-connection pipe PP and valve 300 are designed for high flow rate, which reduces the likelihood of clogging due to debris or the like.

By contrast, the water level in the standpipe in the embodiments of FIGS. 4-5 and of FIG. 8 is determined by both the elevations of the orifices O0, O1, O2 or the pipes P0, P1, P2, and by the flow resistances presented by these orifices or pipes. Those flow resistances cannot be made too low, otherwise the water level in the standpipe will closely track the water level in the RWST.

The ECC system of FIG. 9 is a two-level system. However, a three-level ECC system can be provided by adding an additional float valve-controlled cross-connection pipe with its float at an elevation (i.e. depth) between the elevations of the topmost cross-connection pipe P0 and the float 302. A four-level or higher-level ECC system can be similarly constructed by adding additional pipe/float valve combinations for the different levels. At each level of the ECC system, the water level in the standpipe is pinned to the elevation of the highest-elevation float that lies below the current water level in the RWST.

A float valve is feasible for this application because total head on the valve is typically relatively low (e.g., of order 20 psi in some contemplated embodiments) and low leakage rates through the float valve are acceptable when the float valve is closed. Water temperature is expected to remain below 250° F. making the float 302 relatively easy to design. For example, in some contemplated embodiments the float 302 comprises a closed-cell foam material disposed in a stainless steel liner. Such a flow advantageously is not susceptible to failure by float rupture. The float valve 300 is advantageously a passive device that obtains its operating power from the fluid (i.e. water) being controlled. Redundancy can be provided by including more than one standpipe 270, optionally with multiple redundant float valves in each standpipe (where two float valves are redundant if their floats are at the same elevation).

With reference to FIG. 11, the use of a float valve to control flow can also be employed with internal standpipes 370 located inside of an RWST 312. In this case the inlets to the float valves 300 can be open to the ambient water in the RWST 312, i.e. there is no need for the pipe PP of the embodiment of FIGS. 9 and 10. Additionally, in this embodiment the functionality of the topmost cross-connection pipe P0 can be obtained by constructing the standpipes 370 with open top ends at the elevation corresponding to the elevation of the pipe P0. The illustrative ECC system of FIG. 11 is a two-level system similar to that of FIG. 9; however, FIG. 11 illustrates use of two float valves 300 in a single standpipe 370 so as to provide advantageous redundancy. Further redundancy is provided in the embodiment of FIG. 11 by partitioning the RWST 312 into two compartments, with a standpipe 370 in each section of the RWST 312. In an alternate design, the illustrated two standpipes 370 can be located in the same RWST without partitioning the RWST into multiple compartments.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:
depressurizing the pressure vessel of a nuclear reactor; and
providing cooling of the nuclear reactor core by operations including:
draining water from a refueling water storage tank (RWST) into a standpipe; and
draining water from the standpipe into the depressurized pressure vessel;
wherein the draining of water from the RWST into the standpipe comprises draining water from the RWST into the standpipe through a set of orifices at two or more different elevations along the standpipe, the set of orifices including an uppermost orifice and at least one lower orifice at an elevation below the uppermost orifice, and flow through the at least one lower orifice is controlled by a respective valve, wherein the at least one lower orifice is defined by a seat of the valve.

2. The method of claim 1 wherein the draining of water from the RWST into the standpipe comprises draining water from the RWST into the standpipe through cross-connection pipes connecting the RWST with respective of said orifices at two or more different elevations along the standpipe.

3. The method of claim 2 wherein the draining of water from the RWST into the standpipe comprises:
draining water from the RWST into the standpipe through the uppermost orifice;
draining water from the RWST into the standpipe through one of the lower orifices; and
controlling the draining of water from the RWST into the standpipe through the one of the lower orifices using the valve, wherein the valve is a float valve.

4. The method of claim 3 wherein the float valve has its float disposed in the standpipe at an elevation that is lower than the elevation of the uppermost orifice.

5. The method of claim 1 wherein the draining of water from the RWST into the standpipe comprises:
draining water from the RWST into the standpipe through the uppermost orifice;
draining water from the RWST into the standpipe through one of the lower orifices; and
controlling the draining of water from the RWST into the standpipe through the one of the lower orifices using the valve, wherein the valve is a float valve having its float disposed in the standpipe at an elevation that is lower than the elevation of the first orifice.

6. The method of claim 1 wherein the valve is a float valve that has its float disposed in the standpipe at an elevation that is lower than the elevation of the uppermost orifice.

\* \* \* \* \*

UNITED STATES PATENT AND TRADEMARK OFFICE
CERTIFICATE OF CORRECTION

| | | |
|---|---|---|
| PATENT NO. | : 12,387,855 B2 | Page 1 of 1 |
| APPLICATION NO. | : 17/840137 | |
| DATED | : August 12, 2025 | |
| INVENTOR(S) | : Ronald C. Watson et al. | |

It is certified that error appears in the above-identified patent and that said Letters Patent is hereby corrected as shown below:

On the Title Page
In item (56) References Cited, under "OTHER PUBLICATIONS", Line 2, delete ":<http://odhonline." and insert --:<http://pdhonline.--

In the Drawings
On Sheet 3 of 10, in FIG. 3, Line 8, delete "RSWT" and insert --RWST--

In the Specification
In Column 7, Line 36, delete "do" and insert --d0--
In Column 8, Line 52, delete "do" and insert --d0--

Signed and Sealed this
Twentieth Day of January, 2026

John A. Squires
*Director of the United States Patent and Trademark Office*